Oct. 26, 1965

N. J. SUNDBERG ET AL

RELAY ARRANGEMENT FOR THE RECEPTION AND REPETITION OF IMPULSE TRAINS

Filed Oct. 2, 1961

3,214,522

INVENTORS
NILS JOHN SUNDBERG
GUSTAV EINAR MOLANDER

BY Hane and Nydick
ATTORNEYS 3,214,522
Patented Oct. 26, 1965

3,214,522

RELAY ARRANGEMENT FOR THE RECEPTION AND REPETITION OF IMPULSE TRAINS

Nils John Sundberg and Gustav Einar Molander, Hagersten, Sweden, assignors to Telefonaktiebolaget L M Ericsson, Stockholm, Sweden, a corporation of Sweden

Filed Oct. 2, 1961, Ser. No. 142,360
Claims priority, application Sweden, Oct. 4, 1960, 9,470/60
2 Claims. (Cl. 179—18)

This invention relates to a relay arrangement for improved reception and repetition of impulse trains in an automatic telephone exchange and particularly impulse trains from subscriber's instruments. The impulse trains are sent from a pulse sender, usually a dial, through a two-branch telephone line, a direct current circuit being completed from a central battery in the telephone exchange in a loop through the telephone line and the pulse sender. In telephone exchanges of this kind, it is desirable to obtain an increased impulsing velocity and also a higher resistance and less sensitivity to leakage between the telephone line and ground.

This is achieved according to the invention by means of an impulsing relay for each line branch and a pulse repetition relay which is operated in a local circuit containing the repetition relay and also an additional winding and a make contact on each of said impulsing relays. This additional winding counteracts the magnetization of the respective impulsing relay and ensures the release of the relay upon interruption of said direct current circuit through the telephone line.

The invention will be described below with reference to the enclosed drawings.

Figure 1:
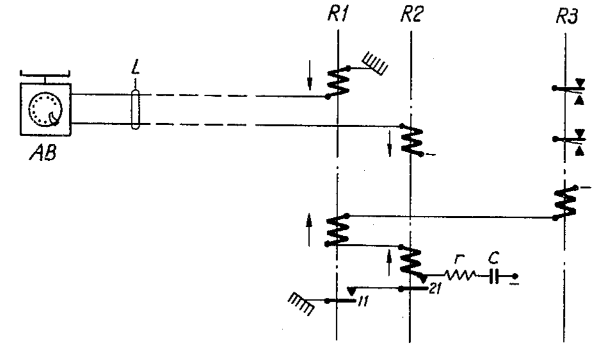
FIG. 1 is a circuit diagram of part of an automatic telephone exchange showing the circuit system of the invention.

In FIG. 1, there is shown a subscriber's instrument AB which through a telephone line L is connected to a relay arrangement R1–R3 for the reception and repetition of pulses in a telephone exchange. The relay arrangement consists of two impulsing relays R1 and R2 and a pulse repetition relay R3. The subscriber's instrument is provided with a dial, by means of which interruptions are effected made in a direct current circuit that is closed from ground through the upper winding or coil relay R1, in a loop through the telephone line L and the dial of the subscriber's instrument AB, through the upper winding or coil of relay R2 to the negative pole of the exchange battery.

When the telephone instrument AB is connected to the relay arrangement R1–R3, the relays R1 and R2 will operate. The contacts 11 and 21 close a local circuit from ground through the contacts 11 and 21, through the lower winding of relay R2 and the lower winding of relay R1 and the winding of relay R3, to negative. The lower windings or coils of the relays R1 and R2 are additional windings which counteract the upper windings of the relays. The relay arrangement includes a quenching circuit consisting of a resistance *r* and a capacitor C. The relay R3 operates but has a considerable inductance and thus the current intensity of the circuit does not reach its full value immediately. The pulse relays R1 and R2 must be quick operating and, to this end, are given a considerable overmagnetization. When the relays have operated the contacts 11 and 21, this overmagnetization is reduced to a value just sufficient to hold the relays in operated condition. By means of current through the lower, counteracting windings, relays R1 and R2 are released quickly when the current through the instrument AB is interrupted by the dial. When either of the relays R1 and R2 releases, the current through R3 and said additional windings on R1 and R2 is broken. As only one make contact on each pulse relay is required, pulses can be transmitted through long lines with high resistance, as well as through short lines with low resistance.

Figure 2:
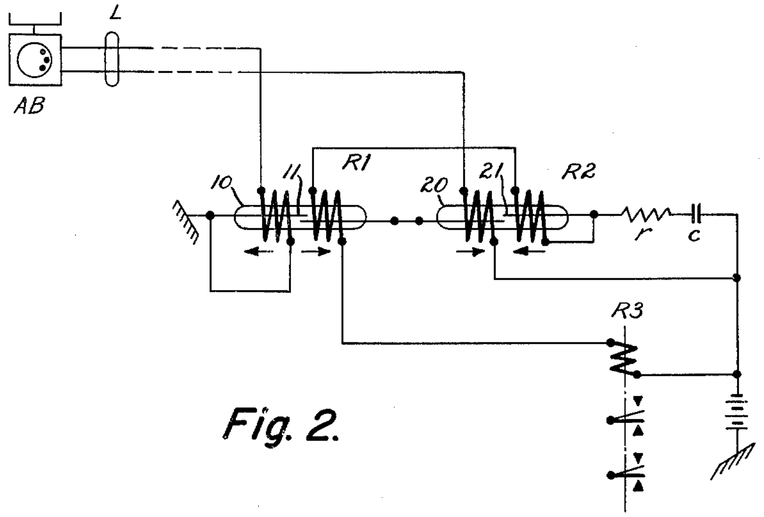
FIG. 2 is a circuit diagram of a modification of the circuit system according to the invention.

If leakage to ground occurs on the wires of the telephone line, difficulties will arise for the relay R3 to follow the impulse trains from the dial, while the relay R1 operates freely. As the contacts 11 and 21 are connected in series, the pulse repetition relay R3 will operate substantially unaffected by the leakage to ground. Also upon leakage between the line branches the relay arrangement shows good results, particularly when magnetic reed relays are used as impulsing relays. FIG. 2 shows such reed relays. The contacts 11' and 21' respectively of the relays consist of two contact springs of magnetic material, enclosed in glass tubes 10 and 20 respectively. The glass tubes are enclosed by the windings of the relays R1 and R2 respectively. When the relay energized is energized, the contact springs will attract each other and touch each other. Such a relay operates very quickly. The counteracting, lower windings of the relays R1 and R2 cause the relays to release quickly and reliably.

We claim:

1. In an automatic telephone exchange in which pulse trains are sent through the exchange by means of a pulse sender included in a two-branch telephone line connected to a D.C. energizing circuit, electromagnetic relay means comprising a pulse relay means having a first and a second coil and a make contact, said first coil being included in said energizing circuit, said second coil and said make contact being connected in series, a pulse repetition relay having an operating coil, the inductance of the coil of the repetition relay being high in relation to the inductance of the first coil of the pulse relay means, a local energizing circuit including the coil of the repetition relay for operating the same, the second coil of the pulse relay means opposing the energization of the first coil thereof by said D.C. circuit, whereby the pulse relay means is rapidly released upon interruption of said D.C. circuit at said pulse sender without delaying operation of the pulse relay means when the D.C. circuit is closed at said pulse sender.

2. A telephone exchange according to claim 1, wherein said pulse relay means comprises two similar pulse relays, the make contact of each of said relays including two contact springs made of magnetizable material and a non-magnetic tube housing said contact springs, said tube being encompassed by the coils of said relays, the first coils of said pulse relays being each connected to one of said branches and the second coils and said make contacts being connected in series in said local circuit.

References Cited by the Examiner

UNITED STATES PATENTS

| | | | |
|---|---|---|---|
| 2,029,723 | 2/36 | Johnson et al. | 179—16 |
| 2,188,461 | 6/40 | McClew | 179—16 |

ROBERT H. ROSE, *Primary Examiner.*

WALTER L. LYNDE, *Examiner.*